(12) United States Patent
Sampson

(10) Patent No.: US 6,628,708 B1
(45) Date of Patent: Sep. 30, 2003

(54) METHOD AND SYSTEM FOR COMPRESSING COLOR VIDEO DATA WITHIN A DATA PROCESSING SYSTEM

(75) Inventor: Gregory Sampson, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/513,431

(22) Filed: Feb. 25, 2000

(51) Int. Cl.[7] ................................................ H04B 1/66
(52) U.S. Cl. ........................ 375/240.01; 375/240.01; 375/240.23; 375/240.24; 382/239; 382/245; 382/166
(58) Field of Search ........................ 375/240.01, 240, 375/240.23, 240.24; 348/391.1, 390.1, 393.1, 384, 420, 453; 382/239, 245, 166

(56) References Cited

U.S. PATENT DOCUMENTS

| | | | | |
|---|---|---|---|---|
| 4,695,883 A | * | 9/1987 | Chandler et al. | 375/240.01 |
| 5,453,787 A | * | 9/1995 | Hancock et al. | 348/391 |
| 5,659,362 A | * | 8/1997 | Kovac et al. | 348/384 |
| 6,356,588 B1 | * | 3/2002 | Otto | 375/240.03 |
| 6,373,890 B1 | * | 4/2002 | Freeman | 375/240 |
| 6,404,927 B1 | * | 6/2002 | Li et al. | 382/232 |

* cited by examiner

*Primary Examiner*—Chris Kelley
*Assistant Examiner*—Shawn S. An
(74) *Attorney, Agent, or Firm*—Carlos Munoz-Bustamante; Bracewell & Patterson, LLP

(57) ABSTRACT

A method for compressing color video data within a data processing system is disclosed. A pixel, which includes multiple bits that forms a color value, is initially received. A determination is made as to whether or not the color value of the pixel falls within a predetermined tolerance range. If the color value of the pixel falls within the predetermined tolerance range, then a single-bit true signal is sent to a compressor. Otherwise, if the color value of the pixel does not fall within the predetermined tolerance range, then the entire color value of the pixel is sent to the compressor.

15 Claims, 6 Drawing Sheets

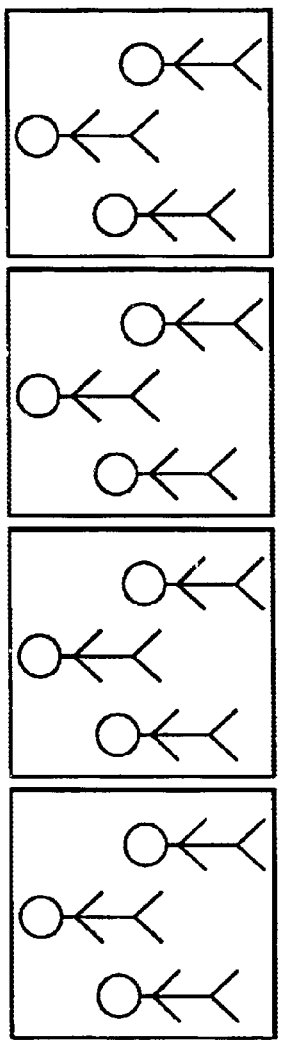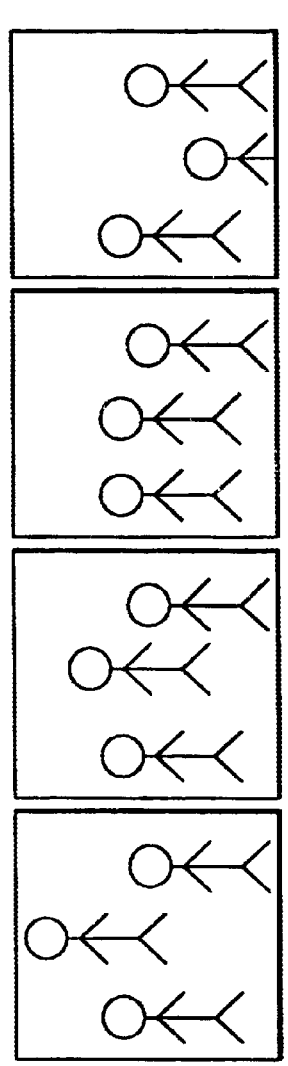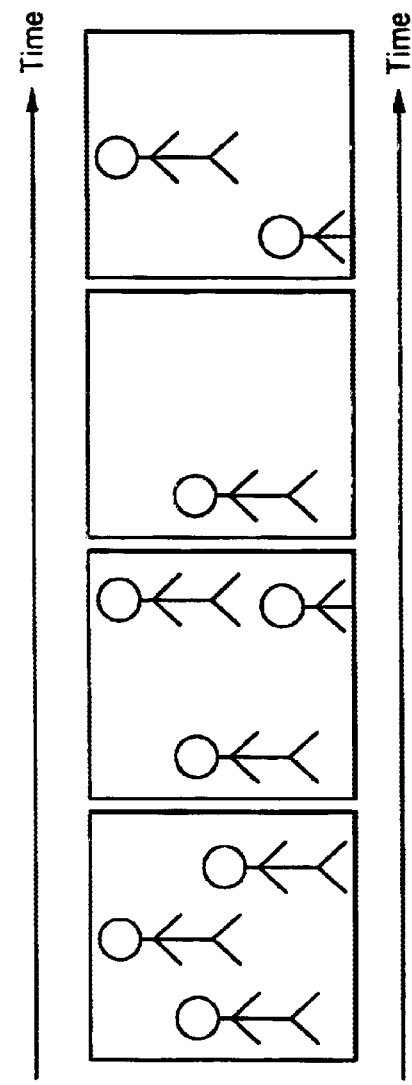

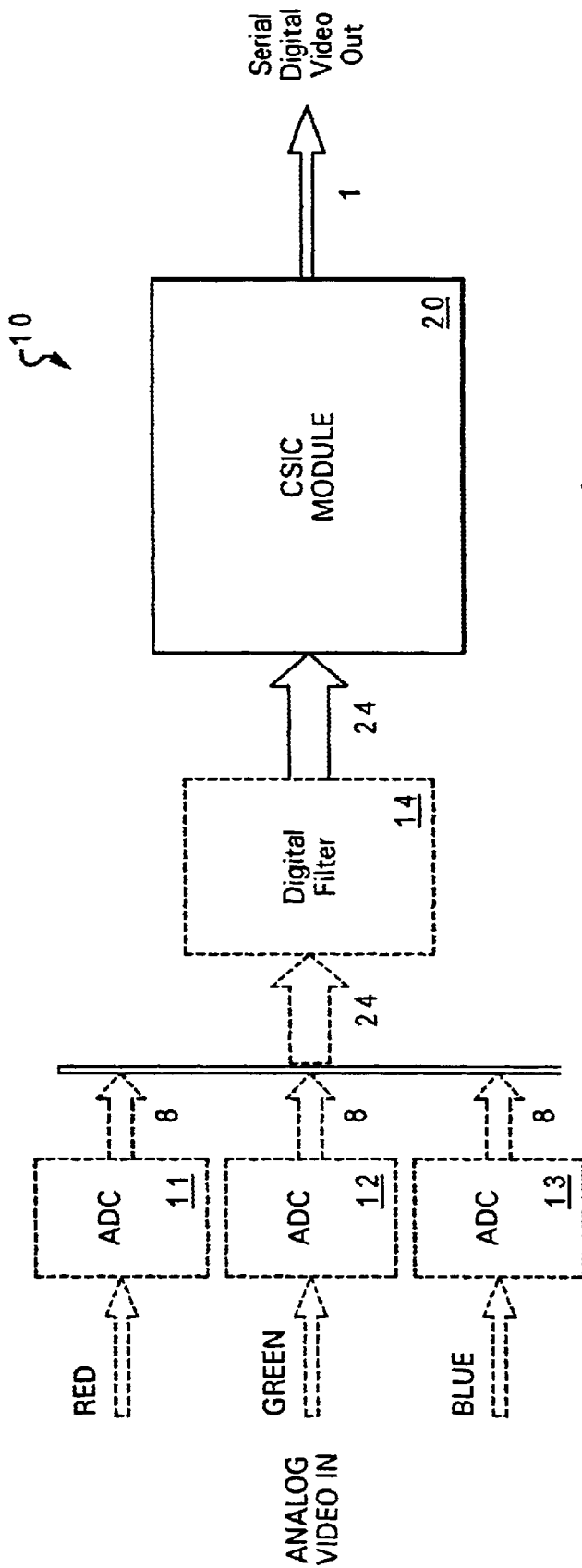

METHOD AND SYSTEM FOR COMPRESSING COLOR VIDEO DATA WITHIN A DATA PROCESSING SYSTEM

BACKGROUND OF THE INVENTION

1. Technical Field

The present invention relates to a method and system for data processing in general, and in particular to a method and system for processing video data within a data processing system. Still more particularly, the present invention relates to a method and system for compressing color video data within a data processing system.

2. Description of the Prior Art

Full-motion video displays based upon analog video signals have long been available in the form of television. With recent improvements in digital is processing capabilities and affordability, full-motion video displays based upon digital video signals are becoming more widely available. Digital video systems can provide significant improvements over their analog counterparts in generating, modifying, transmitting, storing, and playing full-motion video sequences. With digital video systems, each image frame is a still image formed from an array of pixels according to the display resolution of a particular system. The display resolution of digital video systems can range from 640×484 pixels for NTSC based VHS systems to 1280×720 pixels for high-definition television (HDTV) systems.

One problem with digital video systems is that the amount of raw digital information included within video sequences are massive. As an example, a full-length motion picture of two hours in duration in a digitized form of a relatively low resolution VHS image format having a 640×484 pixel resolution could correspond to over 100 gigabytes of digital video information. In response to the limitations in storing or transmitting such massive amounts of digital video information, various video compression standards, such as MPEG-1, MPEG-2, H.26X, etc., have been established. The techniques utilized by these video compression standards are typically based upon the similarities between successive image frames, referred to as temporal or interframe correlation, to provide interframe compression in which pixel-based representations of image frames are converted to motion representations. In addition, some video compression standards utilize similarities within image frames, referred to as spatial or intraframe correlation, to provide intraframe compression in which the motion representations within an image frame are further compressed. Although most video compression standards can typically provide an adequate video compression ratio, it would be desirable to provide an improved digital compression algorithm for compressing color video data.

SUMMARY OF THE INVENTION

In accordance with a preferred embodiment of the present invention, a pixel, which includes multiple bits that forms a color value, is initially received. A determination is made as to whether or not the color value of the pixel falls within a predetermined tolerance range. If the color value of the pixel falls within the predetermined tolerance range, then a single-bit true signal is sent to a compressor. Otherwise, if the color value of the pixel does not fall within the predetermined tolerance range, then the entire color value of the pixel is sent to the compressor.

All objects, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein:

FIGS. 1a–1c are graphical depictions of different types of frame sequences;

FIG. 2 is a block diagram of a digital video system in accordance with a preferred embodiment of the present invention;

FIG. 6 is an example of a serial bit stream output from the pixel/bit packer unit, in accordance with a preferred embodiment of the present invention.

DETAILED DESCRIPTION OF A PREFERRED EMBODIMENT

Figure 3:
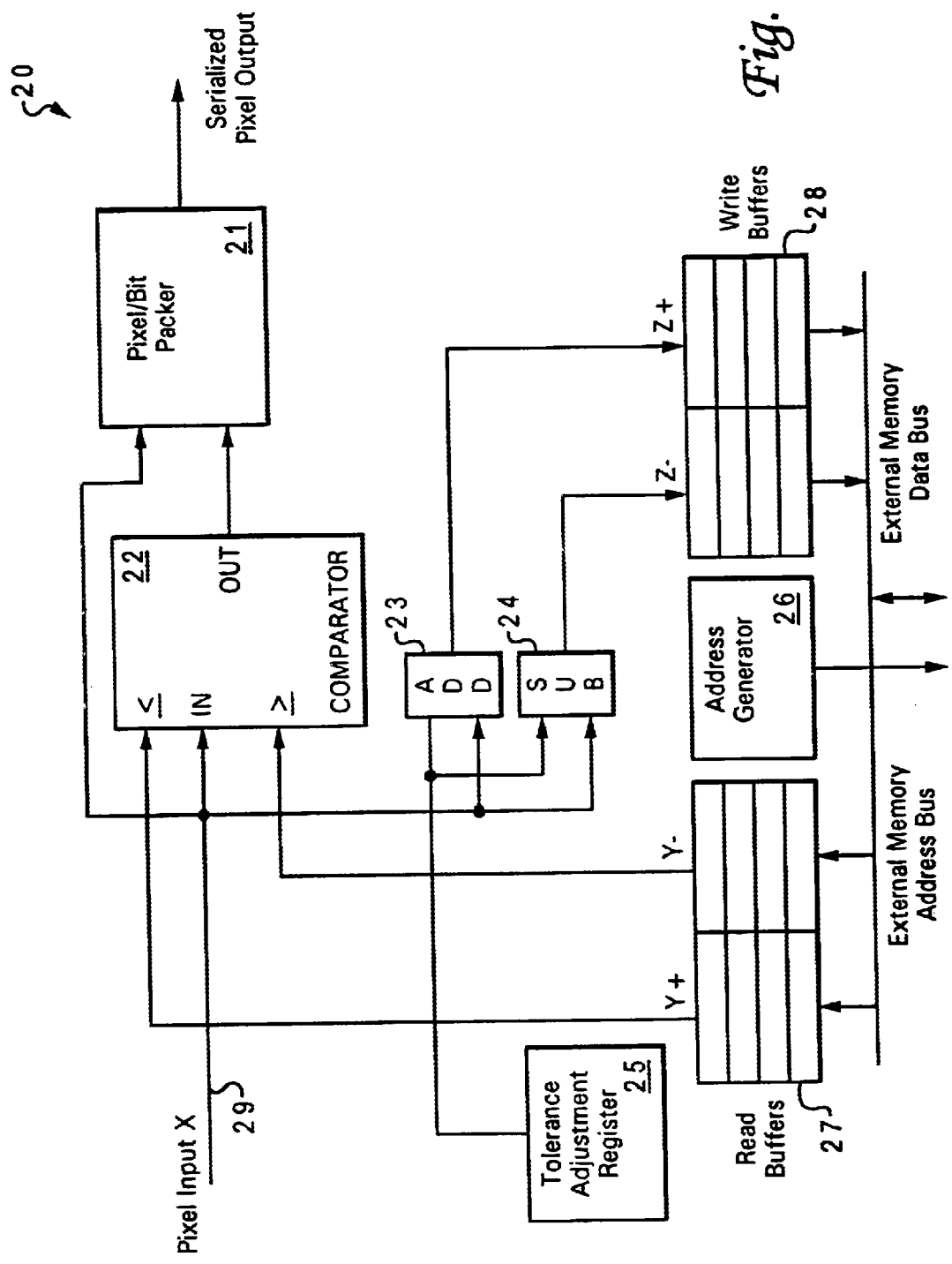
FIG. 3 is a detailed block diagram of a CSIC module within the digital video system from FIG. 2, in accordance with a preferred embodiment of the present invention.

A variety of digital video compression solutions have come to market in recent years; however, all of them have to rely on complicated transforms, such as Wavelet, DCT, and Fractal, to reduce or eliminate non-visible color components of a video sequence. These transforms require either fully custom hardware or complex software coupled with high-speed processors for the compression and decompression of a video data stream. The present invention provides a more cost-effective video compression algorithm known as Color Space Image Compression (CSIC). Based on the fact that human eyes are more sensitive to the intensity of light than the color of that light, CSIC compresses video images by reducing the amount of color information that needs to be transmitted or recorded. With fewer bits per pixel that are required to be encoded and transmitted, data rate can be significantly reduced. As a result, CSIC can be implemented with commodity dynamic random access memory (DRAM) devices and low-speed grade field programmable grid arrays (FPGAs) instead of expensive custom hardware.

Referring now to the drawings and in particular to FIGS. 1a–1c, there are graphically depicted three types of frame sequences that can typically be perceived by a person who is looking at a series of moving images. Type I frame sequences are moving images with many still images (or frames) that are consecutively repeated, as shown in FIG. 1a. Type II frame sequences are moving images with even more consecutive frames that change in small localized regions (e.g., a facial expression changes or a person moves while the background remains), as shown in FIG. 1b. Type III frame sequences are moving images with some smaller percentage of frame sequences but the entire image is different between frames (e.g., an action scene, panning, etc.), as shown in FIG. 1c.

CSIC can effectively compress Type I and Type II frame sequences by not transmitting any color information for Type I frame sequences or by transmitting only the relevant color information for Type II frame sequences. Type III frame sequences represent a relatively small portion of the video stream in most video images. These frames could be considered similar to the MPEG intra-picture frames or I-pictures. I-pictures are basically full frame images and provide potential random access points into the compressed video data. These frames are not compressed in the same manner as MPEG P-Picture or MPEG B-Picture frames. In relatively motionless video applications, such as video phones, video conferencing, video surveillance, etc., CSIC proves to be most effective.

With reference now to FIG. 2, there is depicted a block diagram of a digital video system 10 in accordance with a preferred embodiment of the present invention. As shown, red, green, and blue components of an analog video stream are separately converted into red, green and blue digital video signals by analog-to-digital converters (ADCs) 11, 12, and 13, respectively. The red, green and blue digital video signals are then combined and sent through a digital filter 14. Finally, a CSIC module 20 produces a stream of serial digital video signals from the filtered digital video.

Referring now to FIG. 3, there is illustrated a detailed block diagram of CSIC module 20, in accordance with a preferred embodiment of the present invention. As shown, CSIC module 20 includes a pixel/bit packer 21, a comparator 22, an adder 23, a subtractor 24, and a tolerance adjustment register 25. In addition, CSIC module 20 includes read buffers 27 for supplying old pixel values (from a previous frame) to comparator 22, and write buffers 28 for receiving adjusted new pixel values (from a current frame) from adder 23 and subtractor 24. Read buffers 27 and write buffers 28 are coupled to an external memory such as a set of dynamic random access memories (not shown). An address generator 26 provides a required access address for accessing the external memory. After receiving digital video signals at pixel input 29, CSIC module 20 then compresses the digital video signals into a stream of serial digital video signals.

Figure 4:
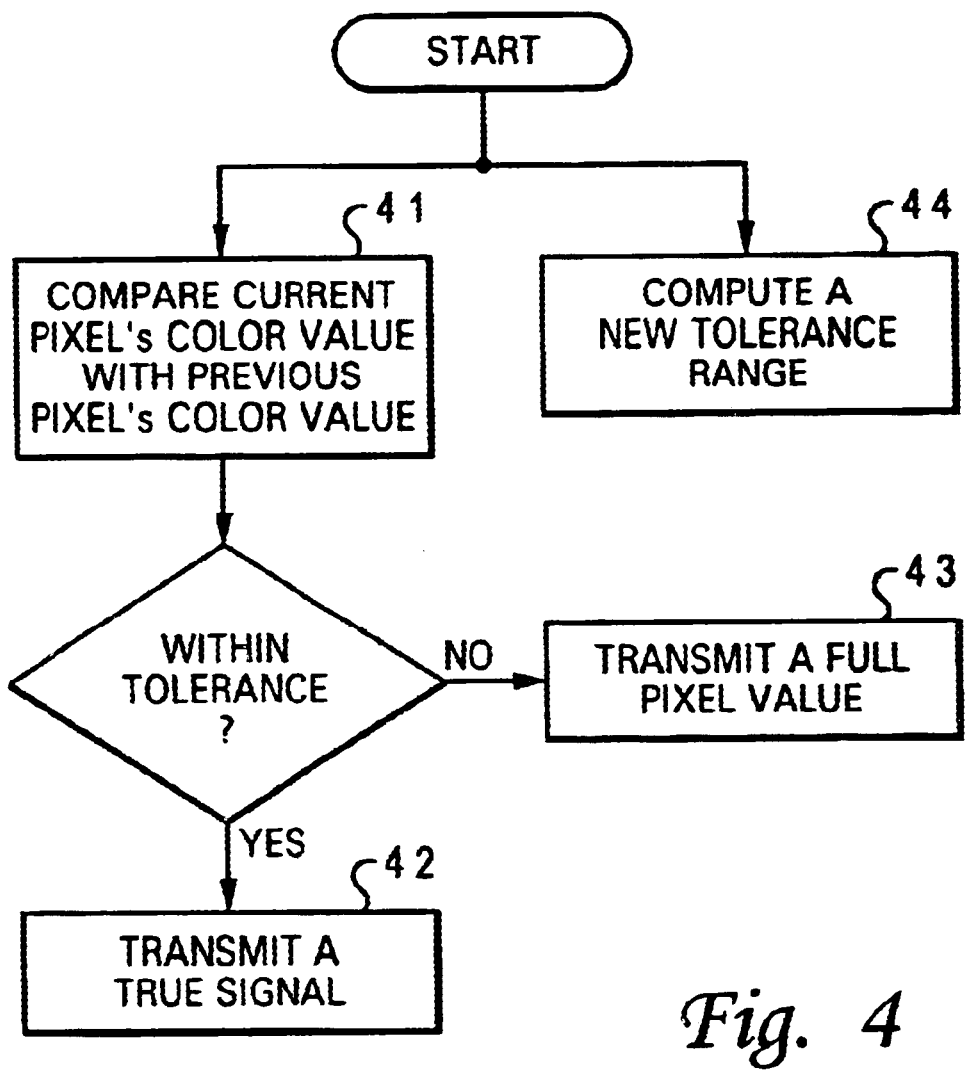
FIG. 4 is a high-level flow diagram of a CSIC algorithm for the CSIC module within the digital video system from FIG. 2, in accordance with a preferred embodiment of the present invention.

With reference now to FIG. 4, there is illustrated a high-level flow diagram of a CSIC algorithm for CSIC module 20, in accordance with a preferred embodiment of the present invention. The initial (or start-up) frame (i.e., no frame has been captured) is, by default, a Type III frame. Assume a frame, which is comprised of an array of pixels, has been captured. The frame can be captured by multiple ADCs within an analog video capture module or sampled by an NTSC video decoder. Using a single pixel for illustration, a pixel X from the current frame is first compared with a same time-displaced pixel Y from an immediate preceding frame, as shown in block 41. The comparison is performed within comparator 22 (from FIG. 3), with pixel Y's color value plus a tolerance value (Y+) as the upper bound, and pixel Y's color value minus the tolerance value (Y−) as the lower bound. The tolerance value is supplied by tolerance adjustment register 25 (from FIG. 3), and the Y+ and Y− values are supplied by read buffers 27 (from FIG. 3). Tolerance adjustment register 25 is accessible via software and is used to adjust image quality with respect to compression ratio. If pixel X's color value falls within the above-indicated upper and lower bounds, then a true signal—a single bit value—is sent to pixel/bit packer unit 21 (from FIG. 3), as illustrated in block 42. Otherwise, if pixel X's color value falls outside the above-indicated upper and lower bounds, then pixel X's color value is transmitted in whole to pixel/bit packer unit 21, as depicted in block 43.

In concurrence with the above-mentioned comparison, both adder 25 and subtractor 26 calculate the upper bound and lower bound values for pixel X, as shown in block 44. The upper bound value for pixel X (i.e., Z+) is pixel X's color value plus a tolerance value supplied by tolerance adjustment register 25, and the lower bound value for pixel X (i.e., Z−) is pixel X's color value minus the tolerance value supplied by tolerance adjustment register 25. The Z+ and Z− values are then stored in the external memory. After exactly one frame later, the Z+ and Z− values are extracted from the external memory and fed to comparator 22. As shown in FIG. 3, all transactions to the external memory are preferably optimized by read buffers 27 and write buffers 28 in order to take advantage of page-mode burst cycles.

Figure 5:
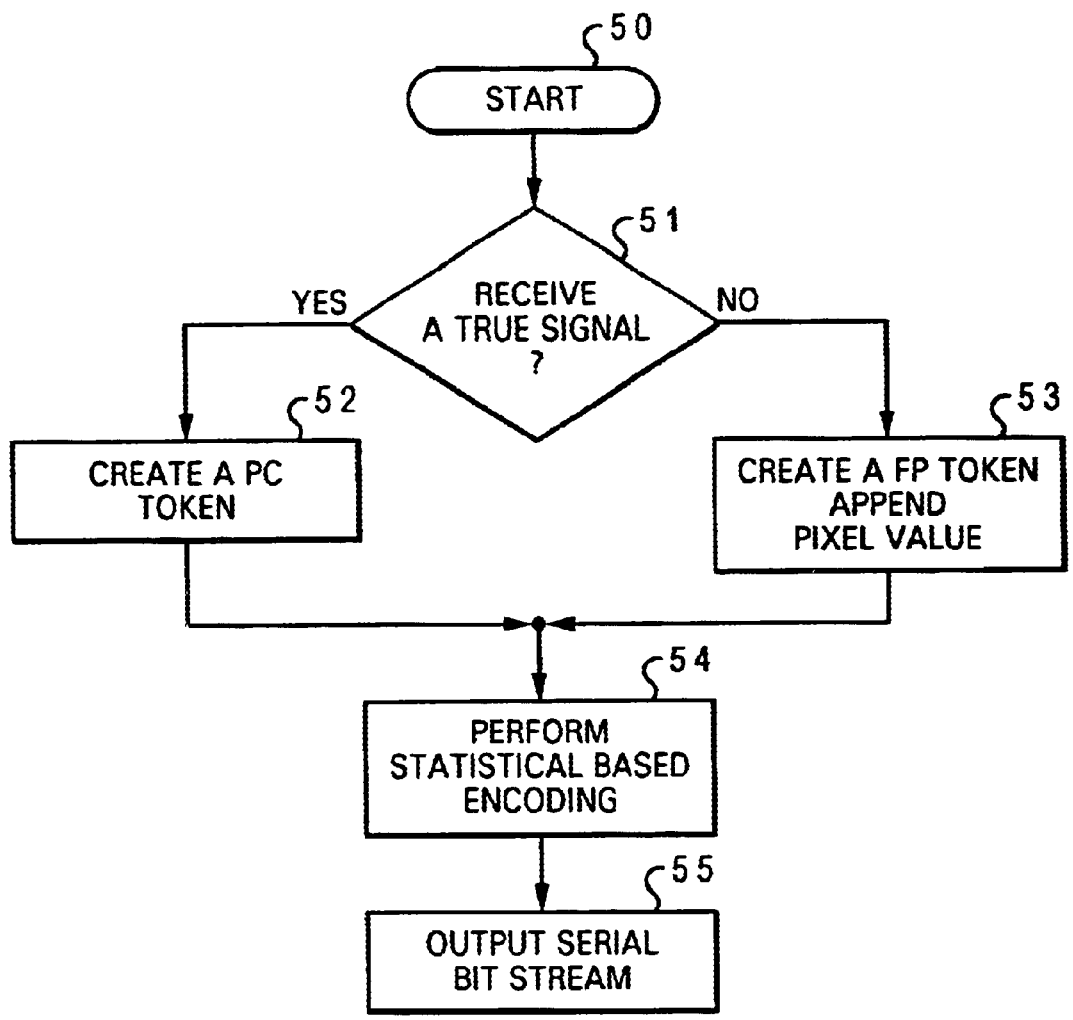
FIG. 5 is a high-level flow diagram of the operations in a pixel/bit packer unit within the digital video system from FIG. 2, in accordance with a preferred embodiment of the present invention.

Pixel/bit packer unit 21 is responsible for performing additional compressions. Referring now to FIG. 5, there is illustrated a high-level flow diagram of the operations of pixel/bit packer unit 21, in accordance with a preferred embodiment of the present invention. Starting at block 50, a determination is made as to whether or not a true signal is received from comparator 22 (from FIG. 3), as shown in block 51. If a true signal is received, a Pixel Compare Token (PC token) is formed, as depicted in block 52.

However, if a true signal is not received from comparator 22, a Full Pixel token (FP token) is formed, and the value of the current pixel is appended to the FP token, as shown in block 53. The PC tokens and the FP tokens along with pixel value are further compressed by performing a statistical based type of encoding, such as run-length encoding or Huffman encoding, as depicted in block 54. Run-length encoding should perform well for Type I and Type II frame sequences because in Type I and Type II frame sequences, a large number of compares would result in very long sequences of "1 's". Huffman encoding could also be used to further compress the video stream and may work well for Type III frame sequences. Finally, a serial bit stream is output from pixel/bit packer 21, as illustrated in block 55. An example of a serial bit stream produced by pixel/bit packer 21 is shown in FIG. 6.

The same technique of comparing tolerance values can be applied to pixels within the same vertical row to achieve even greater compression. This form of "inter-row" compression does not rely on the temporal components of the image. Each of the different type frame sequences (including Type III) can benefit from this technique because of the color uniformity of adjacent pixels naturally present in images (otherwise, the image would be random noise or colored "snow"). When adjacent pixels are determined to be within tolerance, an Inter Row Token (IR token) is generated. An IR token includes an unique identifier, a pixel count, and a pixel value. Again, tolerance adjustment value can be tuned to determine the optimal compression ratio at the expense of image quality.

The compressed serialized bit stream can be decompressed entirely by software, which includes the parsing of the serialized bit stream for different tokens. In order to decompress an image, the decompressor modifies stored values in a frame buffer or image file based upon the tokens received from the serialized bit stream. The decompressor must know, in advance, the resolution of the original video image. Each token is then decomposed and the decompressor modifies each token accordingly.

Figure 7:
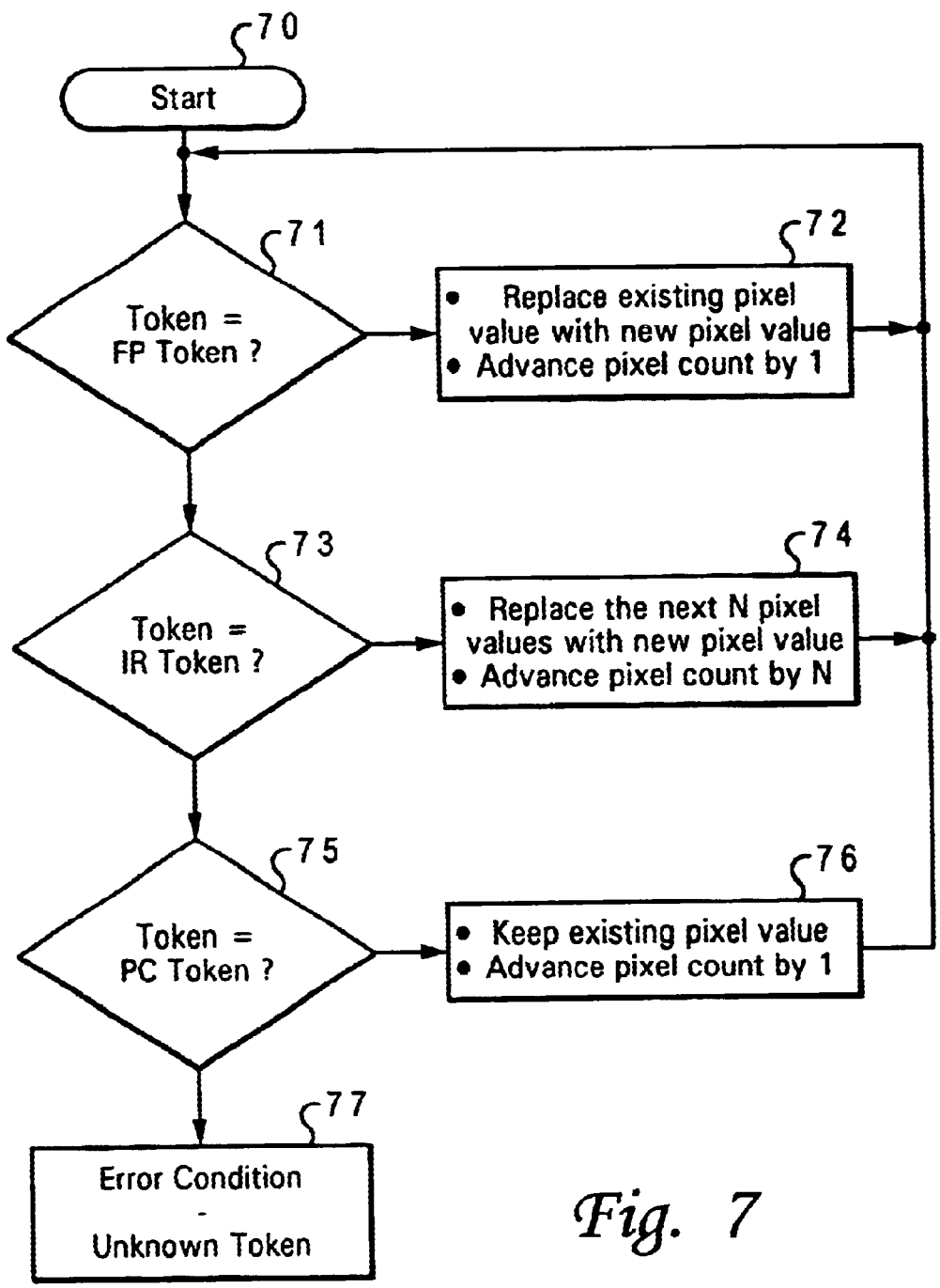
FIG. 7 is a high-level logic flow diagram of a method for decompressing a compressed serialized bit stream, in accordance with a preferred embodiment of the present invention.

Referring now to FIG. 7, there is illustrated a high-level logic flow diagram of a method for decompressing a compressed serialized bit stream, in accordance with a preferred embodiment of the present invention. Starting at block 70, a determination is made whether or not a token is a FP token, as shown in block 71. If the token is a FP token, then the existing pixel value is replaced with a new pixel value, and the pixel count is advanced by one, as depicted in block 72. If the token is not a FP token, then another determination is made whether or not the token is an IR token, as shown in block 73. If the token is an IR token, then the next N pixel values are replaced with a new pixel value, and the pixel count is advanced by N, as depicted in block 74. If the token is not an IR token, then another determination is made whether or not the token is a PC token, as shown in block 75. If the token is a PC token, then the existing pixel value is kept, and the pixel count is advanced by 1, as depicted in block 76. Otherwise, the token is unknown, as illustrated n block 77.

Using the serial bit stream from FIG. 6 as an example, the following sequence will be generated by decompressing the serial bit stream from FIG. 6:

FP Token: replace current pixel value with a new pixel value (i.e., the pixel value that follows the FP Token);

PC Token: keep existing pixel value;

PC Token: keep existing pixel value;

PC Token: keep existing pixel value;

PC Token: keep existing pixel value;

FP Token: replace current pixel value with a new pixel value (i.e., the pixel value that follows the FP Token); and IR Token: replace next N pixel values with a new pixel value (i.e., the pixel value that follows the IR Token).

As has been described, the present invention provides an improved method for compressing video data within a data processing system. CSIC compresses video image by reducing the amount of color information that needs to be transmitted or recorded. There are three key advantages to CSIC. First, CSIC provides significant reduction in algorithm complexity and resultant implementation size. Second, CSIC eliminates MPEG-type image artifacts such as blocking, dropouts, etc. Third, no conversion is required from RGB to YUV color formats. CSIC is capable of producing greater than a 24-to-1 compression ratio. Additional compression can be obtained through conventional lossless compression means (run-length, Huffman, etc.) In addition, CSIC can be implemented with a standard 10–20K gate FPGA and a two Mbits of fast-page Mode DRAM. Since CSIC removes elements of the video image to which the eye is less sensitive, noticeable artifacts are minimized. The simplicity of CSIC allows it to be used in a multitude of applications where video images would not have otherwise been possible because of the high processing power that is necessary to implement more common algorithms like MPEG. It is understood by those skilled in the art that the present invention is also applicable to black-and-white video data having grayscale instead of color values.

It is also important to note that although the present invention has been described in the context of a fully functional digital video system, those skilled in the art will appreciate that the mechanisms of the present invention are capable of being distributed as a program product in a variety of forms, and that the present invention applies equally regardless of the particular type of signal bearing media utilized to actually carry out the distribution. Examples of signal bearing media include, without limitation, recordable type media such as floppy disks or CD ROMs and transmission type media such as analog or digital communications links.

While the invention has been particularly shown and described with reference to a preferred embodiment, it will be understood by those skilled in the art that various changes in form and detail may be made therein without departing from the spirit and scope of the invention.

What is claimed is:

1. A method for compressing color video data within a data processing system, said method comprising the steps of:

receiving a pixel input, wherein said pixel includes a plurality of bits that forms a value;

determining whether or not said color value of said pixel falls within a predetermined tolerance range, wherein said predetermined tolerance range is obtained by adding and subtracting a color value of a pixel from a frame immediately preceding a frame of said pixel to provide an upper bound and a lower bound, respectively;

in response to a determination that said color value of said pixel falls within said predetermined tolerance range, sending a single-bit true signal to a compressor; and in response to a determination that said color value of said pixel does not fall within said predetermined tolerance range, sending said color value of said pixel to said compressor.

2. The method according to claim 1, wherein said color value is grayscale value.

3. The method according to claim 1, wherein said predetermined tolerance range is adjustable.

4. The method according to claim 1, wherein said method further includes a step of performing a statistical based encoding by said compressor.

5. The method according to claim 4, wherein said statistical based encoding is run-length or Huffman encoding.

6. A computer system for compressing color video data within a data processing system, said computer system comprising:

means for receiving a pixel input, wherein said pixel includes a plurality of bits that forms a value;

means for determining whether or not said color value of said pixel falls within a predetermined tolerance range, wherein said predetermined tolerance range is obtained by adding and subtracting a color value of a pixel from a frame immediately preceding a frame of said pixel to provide an upper bound and a lower bound, respectively;

means for sending a single-bit true signal to a compressor, in response to a determination that said color value of said pixel falls within said predetermined tolerance range; and means for sending said color value of said pixel to said compressor, in response to a determination that said color value of said pixel does not fall within said predetermined tolerance range.

7. The computer system according to claim 6, wherein said color value is grayscale value.

8. The computer system according to claim 6, wherein said predetermined tolerance range is adjustable.

9. The computer system according to claim 6, wherein said computer system further includes a means for performing a statistical based encoding by said compressor.

10. The computer system according to claim 9, wherein said statistical based encoding is run-length or Huffman encoding.

11. A computer program product residing on a computer usable medium for compressing color video data within a data processing system, said computer program product comprising:

program code means for receiving a pixel input, wherein said pixel includes a plurality of bits that forms a value;

program code means for determining whether or not said color value of said pixel falls within a predetermined tolerance range, wherein said predetermined tolerance range is obtained by adding and subtracting a color value of a pixel from a frame immediately preceding a frame of said pixel to provide an upper bound and a lower bound, respectively;

program code means for sending a single-bit true signal to a compressor, in response to a determination that said color value of said pixel falls within said predetermined tolerance range; and program code means for sending said color value of said pixel to said compressor, in response to a determination that said color value of said pixel does not fall within said predetermined tolerance range.

12. The computer program product according to claim 11, wherein said color value is grayscale value.

13. The computer program product according to claim 11, wherein said predetermined tolerance range is adjustable.

14. The computer program product according to claim 11, wherein said computer program product further includes a program code means for performing a statistical based encoding said compressor.

15. The computer program product according to claim 14, wherein said statistical based encoding is run-length or Huffman encoding.

* * * * *